(12) United States Patent
Nagasaka et al.

(10) Patent No.: US 8,922,514 B2
(45) Date of Patent: Dec. 30, 2014

(54) DISPLAY DEVICE, CONTROL METHOD AND PROGRAM THEREOF

(75) Inventors: Hidenori Nagasaka, Toyota (JP); Shigehiko Sugeda, Tokai (JP)

(73) Assignee: Aisin Aw Co., Ltd., Anjo (JP)

( * ) Notice: Subject to any disclaimer, the term of this patent is extended or adjusted under 35 U.S.C. 154(b) by 2 days.

(21) Appl. No.: 13/824,901

(22) PCT Filed: Mar. 15, 2012

(86) PCT No.: PCT/JP2012/057653
§ 371 (c)(1),
(2), (4) Date: Mar. 18, 2013

(87) PCT Pub. No.: WO2012/133254
PCT Pub. Date: Oct. 4, 2012

(65) Prior Publication Data
US 2013/0181929 A1    Jul. 18, 2013

(30) Foreign Application Priority Data

Mar. 29, 2011 (JP) ................. 2011-073157

(51) Int. Cl.
| | |
|---|---|
| G09G 5/00 | (2006.01) |
| G06F 3/041 | (2006.01) |
| G06F 3/0485 | (2013.01) |
| G06F 3/0488 | (2013.01) |

(52) U.S. Cl.
CPC ............ *G06F 3/0416* (2013.01); *G06F 3/0485* (2013.01); *G06F 3/0488* (2013.01)
USPC .......................................... 345/173; 345/684

(58) Field of Classification Search
CPC ..... G06F 3/041; G06F 3/0485; G06F 3/0488; G06F 3/0416; G09G 5/34
USPC .................... 345/173, 684; 715/784
See application file for complete search history.

(56) References Cited

U.S. PATENT DOCUMENTS 7,750,895 B2 *  7/2010  Andrews et al. ............... 345/179
7,755,612 B2 *  7/2010  Park et al. ...................... 345/173

(Continued)

FOREIGN PATENT DOCUMENTS

JP        A-10-161628          6/1998

OTHER PUBLICATIONS

Oct. 8, 2012 International Search Report issued in International Application No. PCT/JP2012/057653.

(Continued)

*Primary Examiner* — Tom Sheng
(74) *Attorney, Agent, or Firm* — Oliff PLC

(57) ABSTRACT

When a touching object has touched a touch panel, a reference point position RP, a dead zone DZ, and a scroll target position SP* are set based on a touch position TP (S110 to S130); when the touch position TP has moved outside the dead zone DZ, the scroll target position SP* is updated with the touch position TP (S200) and unit scroll control is executed to control a display such that the reference point position RP moves toward the scroll target position SP* (a displayed image is scrolled) (S220); wherein, when the touch position TP has moved outside the dead zone DZ, the dead zone DZ is updated such that the position between the touch position TP and the reference point position RP just before the unit scroll control is executed becomes the center position of the dead zone DZ (S230).

8 Claims, 8 Drawing Sheets

(56) References Cited

U.S. PATENT DOCUMENTS

| | | |
|---|---|---|
| 2001/0045949 A1 | 11/2001 | Chithambaram et al. |
| 2004/0100479 A1 | 5/2004 | Nakano et al. |
| 2005/0162406 A1* | 7/2005 | Ono et al. ............... 345/173 |
| 2006/0256091 A1* | 11/2006 | Hino ....................... 345/173 |
| 2008/0143687 A1* | 6/2008 | Nakasaka ............... 345/173 |
| 2008/0309630 A1* | 12/2008 | Westerman ............ 345/173 |
| 2009/0002396 A1 | 1/2009 | Andrews et al. |
| 2009/0303196 A1* | 12/2009 | Furukawa ............... 345/173 |
| 2012/0066627 A1* | 3/2012 | Furukawa et al. ...... 715/768 |
| 2012/0127107 A1* | 5/2012 | Miyashita et al. ...... 345/173 |
| 2012/0172091 A1* | 7/2012 | Kurane ................... 455/566 |

OTHER PUBLICATIONS

Oct. 8, 2012 Written Opinion of the International Searching Authority issued in International Application No. PCT/JP2012/057653.

* cited by examiner

F I G. 4A
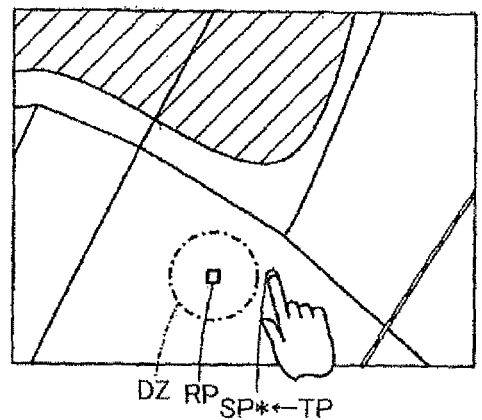
DZ RP SP*←TP
F I G. 4B
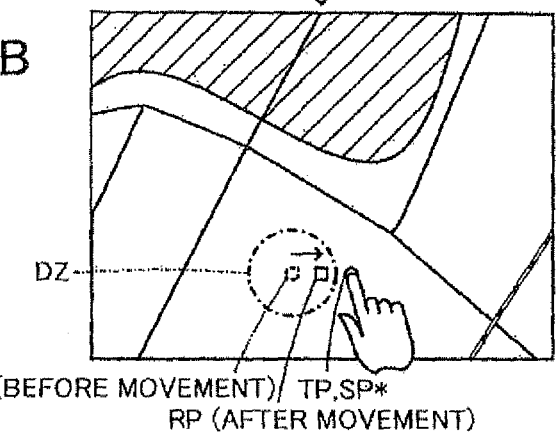
RP (BEFORE MOVEMENT) / TP,SP*
RP (AFTER MOVEMENT)
F I G. 4C
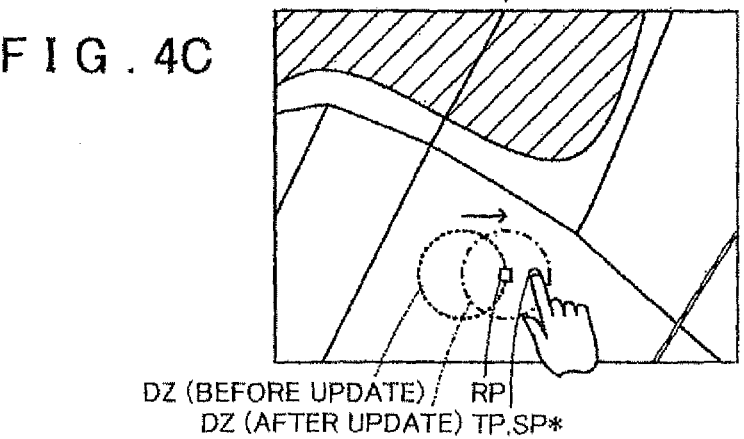
DZ (BEFORE UPDATE) / RP
DZ (AFTER UPDATE) TP,SP*

DISPLAY DEVICE, CONTROL METHOD AND PROGRAM THEREOF

TECHNICAL FIELD

The present invention relates to a display device, a control method and a program of the display device.

BACKGROUND ART

Conventionally, display devices are being proposed, which are provided with an image display part that performs image display and a coordinate input part (a touch panel) installed on a front surface of the image display part, and when getting in a touch status due to the occurrence of input data from the coordinate input part through a touch on the touch panel, performs control to scroll a screen based on a change vector of an input coordinate given as the input data (for example, refer to PTL1). These devices repeatedly perform control to scroll the screen by a changed amount according to a change vector of the input coordinate.

CITATION LIST

Patent Literature

PTL1: Japanese Patent Laid-Open No. H10-161628

SUMMARY OF INVENTION

Technical Problem

In recent years, in order to prevent the screen from being scrolled along with an unintended movement of a touched position (the input coordinate) of a touching object such as a finger, a pen, or the like, it is studied to set a dead zone including the input coordinate as a center position when the touching object has started to touch the touch panel so that the screen is not scrolled while the input coordinate is within the dead zone later. In case of scrolling the screen according to the input coordinate using this technology, a target position of scroll on a screen is not updated if the input coordinate is inside the dead zone, and the target position is updated with the input coordinate if the input coordinate is outside the dead zone and the screen is scrolled toward the finally-updated target position. In this case, when the input coordinate has moved outside the dead zone, if the dead zone is updated such that the moved input coordinate becomes the center position of the dead zone, the time until the input coordinate moves outside the dead zone next after the dead zone has been updated becomes relatively long and the updating frequency of the target position of scroll decreases, which could make the screen scroll nonsmooth.

It is a main object of the display device, the control method and the program of the display device to realize a smoother scroll when scrolling the displayed image.

Solution to Problem

To achieve the aforementioned main object, the display device, the control method and the program of the display device according to the present invention apply the following means.

A display device according to the present invention, including a display unit that displays an image on an image display surface and a touch panel that detects a touched position of a touching object, the touch panel being installed on the image display surface of the display unit, includes: a dead zone setting unit that, when the touching object has touched the touch panel, sets as a dead zone an area including a touched position of the touching object on the touch panel as a center position of the set area; a scroll target position setting unit that, when the touching object has not moved outside the set dead zone with the touch panel being touched, holds a scroll target position serving as a target position of scroll of a displayed image that is an image displayed on the image display surface, and when the touching object has moved outside the set dead zone with the touch panel being touched, updates the scroll target position with the touched position of the touching object on the touch panel; and a scroll controlling unit that controls the display unit such that the displayed image is scrolled according to the set scroll target position, wherein the dead zone setting unit, when the touching object has moved outside the set dead zone with the touch panel being touched, updates the dead zone such that an intermediate position becomes the center position of the dead zone, the intermediate position between the touched position of the touching object on the touch panel and the center position of the set dead zone.

In the display device according to the present invention, when the touching object has touched the touch panel, the area including the touched position of the touching object on the touch panel at the center position is set as the dead zone; when the touching object has not moved outside the dead zone with the touch panel being touched, the scroll target position serving as a target position of scroll of the displayed image that is the image displayed on the image display surface is held, and when the touching object has moved outside the dead zone with the touch panel being touched, the scroll target position is updated with the touched position of the touching object on the touch panel; and the display unit is controlled such that the displayed image is scrolled according to the set scroll target position, wherein, when the touching object has moved outside the currently-set dead zone with the touch panel being touched, the dead zone is updated such that the intermediate position that is a position between the touched position of the touching object on the touch panel and the center position of the currently-set dead zone becomes the center position of the dead zone. Thereby, compared to updating the dead zone such that the touched position of the touching object on the touch panel becomes the center position of the dead zone when the touching object has moved outside the currently-set dead zone with the touch panel being touched, it becomes difficult that the touched position of the touching object enters the dead zone, and the time until the touched position of the touching object moves outside the dead zone next becomes short when the touching object is moving with the touch panel being touched. Therefore, it is possible to make the movement of the scroll target position smoother by increasing the updating frequency of the scroll target position based on the touched position of the touching object. As a result, it becomes possible to make the scroll of the displayed image based on the scroll target position smoother.

In the above-mentioned display device according to the present invention, the display device may include a display reference point setting unit that, when the touching object has touched the touch panel, sets as a display reference point a position in the displayed image corresponding to the touched position of the touching object on the touch panel, wherein the scroll controlling unit is a unit that repeatedly executes unit scroll control to control the display unit such that a reference point position that is a position on the display unit corresponding to the set display reference point is moved toward the set scroll target position by a distance shorter than a distance between the reference point position and the set scroll target position when scrolling the displayed image, and the dead zone setting unit is a unit that updates the center position of the dead zone using the reference point position that was moved through an execution of the unit scroll control as the intermediate position. In this manner, it is possible to make the display reference point difficult to be hidden by the touching object or the like, because the reference point position moves following the movement of the scroll target position when the scroll target position is moving. In addition, it is possible to make the touched position of the touching object difficult to enter the dead zone when the touching object is moving with the touch panel being touched, because the dead zone moves following the movement of the touching object. In the display device according to the present invention having the above configuration, the scroll control unit may be a unit that controls the display unit, as the unit scroll control, such that the reference point position is moved toward the set scroll target position by a predetermined rate of the distance between the set scroll target position and the reference point position. Here, the "predetermined rate" may be a rate that is more than a value 0 but less than a value 1, for example, 0.4, 0.5, 0.6, or the like, of the distance between the scroll target position and the reference point position.

In the display device according to the present invention, the dead zone setting unit may be a unit that, after the touching object has moved outside the set dead zone with the touch panel being touched, updates the dead zone such that the intermediate position that gradually moves toward the set scroll target position becomes the center position of the dead zone. In such manner, it is possible to make the touched position of the touching object difficult to enter the dead zone when the touching object is moving with the touch panel being touched, because the dead zone moves following the movement of the touching object. In the display device according to the present invention having the above configuration, the display device may include a display reference point setting unit that, when the touching object has touched the touch panel, sets as a display reference point a position in the displayed image corresponding to the touched position of the touching object on the touch panel, wherein the scroll controlling unit is a unit that repeatedly executes unit scroll control to control the display unit such that a reference point position that is a position on the display unit corresponding to the set display reference point is moved toward the set scroll target position by a distance shorter than a distance between the reference point position and the set scroll target position when scrolling the displayed image. In such manner, it is possible to make the display reference point difficult to be hidden by the touching object or the like because the display reference point moves following the movement of the scroll target position when the scroll target position is moving. In the display device according to the present invention having the above configuration, the scroll controlling unit may be a unit that controls the display unit, as the unit scroll control, such that the reference point position accords to the center position of the set dead zone.

A control method of a display device according to the present invention, the control method of the display device including a display unit that displays an image on an image display surface and a touch panel that detects a touched position of a touching object, the touch panel being installed on the image display surface of the display unit, includes the steps of: (a) when the touching object has touched the touch panel, setting as a dead zone an area including a touched position of the touching object on the touch panel as a center position of the set area; (b) when the touching object has not moved outside the set dead zone with the touch panel being touched, holding a scroll target position serving as a target position of scroll of a displayed image that is an image displayed on the image display surface, and when the touching object has moved outside the set dead zone with the touch panel being touched, updating the scroll target position with the touched position of the touching object on the touch panel; and (c) controlling the display unit such that the displayed image is scrolled according to the set scroll target position, wherein the step (a) is a step of updating, when the touching object has moved outside the set dead zone with the touch panel being touched, the dead zone such that an intermediate position becomes the center position of the dead zone, the intermediate position being a position between the touched position of the touching object on the touch panel and the center position of the set dead zone.

In the control method of the display device according to the present invention, when the touching object has touched the touch panel, the area including the touched position of the touching object on the touch panel as the center position of the set area is set as the dead zone; when the touching object has not moved outside the dead zone with the touch panel being touched, the scroll target position serving as the target position of scroll of the displayed image that is an image displayed on the image display surface is held, and when the touching object has moved outside the dead zone with the touch panel being touched, the scroll target position is updated with the touched position of the touching object on the touch panel; and the display unit is controlled such that the displayed image is scrolled according to the set scroll target position, wherein, when the touching object has moved outside the set dead zone with the touch panel being touched, the dead zone is updated such that an intermediate position becomes the center position of the dead zone, the intermediate position being a position between the touched position of the touching object on the touch panel and the center position of the set dead zone. Thereby, compared to updating the dead zone such that the touched position of the touching object on the touch panel becomes the center position of the dead zone when the touching object has moved outside the currently-set dead zone with the touch panel being touched, it becomes difficult that the touched position of the touching object enters the dead zone and the time until the touched position of the touching object moves outside the dead zone next becomes short when the touching object is moving with the touch panel being touched. Therefore, it is possible to make the movement of the scroll target position smoother by increasing the updating frequency of the scroll target position based on the touched position of the touching object. As a result, it becomes possible to make the scroll of the displayed image based on the scroll target position smoother.

A program according to the present invention causes a computer to execute the respective steps of the above-mentioned control method of the display device. The program may be recorded in a storage medium (for example, a hard disk, a flash memory, a ROM, a CD, a DVD, or the like) capable of reading the computer, or may be transmitted from a computer to another computer via a transmission medium (communication network such as an Internet, a LAN and the like). The program can be transmitted in any manners. By causing the computer to execute the program, the same effects as the control method of the display device can be obtained because the respective steps of the above mentioned control method of the display device are executed.

BRIEF DESCRIPTION OF DRAWINGS

FIGS. 4A, 4B, and 4C illustrate an example of processings at Step S200 to S230 when a touch position TP is outside a dead zone DZ.

DESCRIPTION OF EMBODIMENTS

The present invention is described in further detail below with reference to an embodiment.

Figure 1:
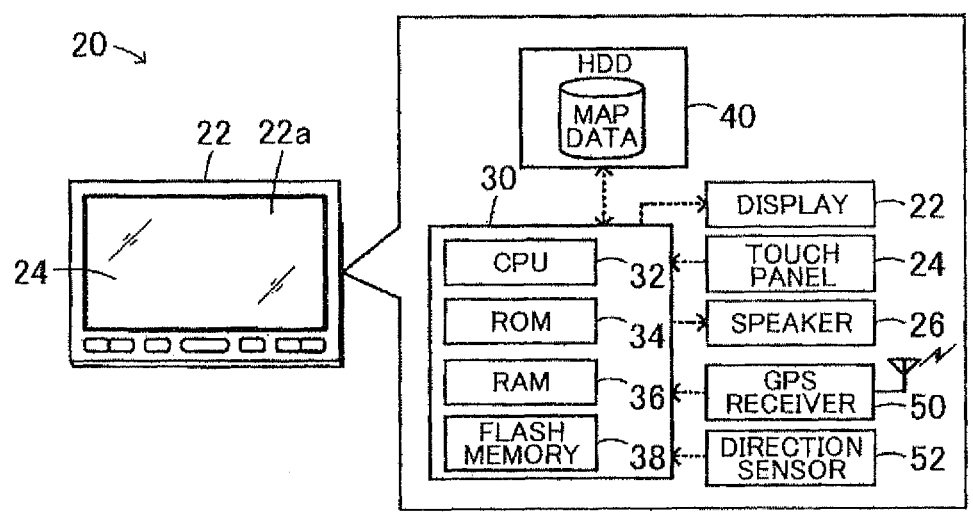
FIG. 1 is a block diagram illustrating schematic structure of a navigation device 20 as a display device according to an embodiment of the present invention.

FIG. 1 is a block diagram illustrating schematic structure of a navigation device 20 as a display device according to an embodiment of the present invention. As shown in FIG. 1, the navigation device 20 is provided with a display 22 including an image display surface 22a, a touch panel 24 installed on the image display surface 22a of the display 22, an electric control unit 30 that controls overall device, and a hard disk drive (hereinafter, referred to as HDD) 40 as a large capacity memory that stores various kinds of application software, map data, and the like. The navigation device 20 is operated upon receiving power supply from an in-vehicle battery mounted on a vehicle (not shown).

The display 22 is, for example, a liquid crystal display that includes a rectangular-shaped image display surface 22a to display letters and images. The touch panel 24 is a touch panel that detects a touch position TP that is a touched position of a touching object such as a finger, a pen, or the like on the touch panel. In addition, as a detection method of the touch position TP by the touch panel 24, a resistive method, a capacitance method, an infrared method, an electromagnetic induction method, a surface acoustic wave method, or the like can be utilized.

The electric control unit 30 is a micro processor having a CPU 32 at the center. The electric control unit 30 is provided with, in addition to the CPU 32, a ROM 34 that stores various kinds of processing programs, a RAM 36 that temporarily stores data, a nonvolatile flash memory that holds the stored data, and an input-output port and a communication port (not shown). Into the electric control unit 30, the touch position TP from the touch panel 24, the data read from the HDD 40, signals from a GPS receiver 50 that receives signals from a GPS (Global Positioning System) satellite via a GPS antenna, signals from a direction sensor 52 that is, for example, a gyro sensor detecting a travel direction of the vehicle and its change, and the like are inputted via the input port. From the electric control unit 30, display signals to the display 22, audio signals to a speaker 26 equipped with an amplifier, data to write into the HDD 40, and the like are outputted via the output port. In addition, the electric control unit 30 is connected to a vehicular electric control unit (not shown) that controls the overall vehicle via the communication port. The electric control unit 30 inputs the data regarding the status of the vehicle by communication as well as outputs data regarding the status of the navigation device 20 as needed.

In the navigation device 20 according to the embodiment, the electric control unit 30 reads necessary application software and map data from the HDD 40 and executes various kinds of processing. For example, the electric control unit 30 executes processings such as a location processing that determines a current position of the vehicle based on the signals from the GPS receiver 50 and the signals from the direction sensor 52, a map display processing that displays a map image including roads on the display 22, a destination input processing that inputs a destination based on an operation on the touch panel 24 by an operator, a navigation processing that searches for a travel route to the destination and provides route guidance by a map display and by audio output from the speaker 26.

Figure 2:
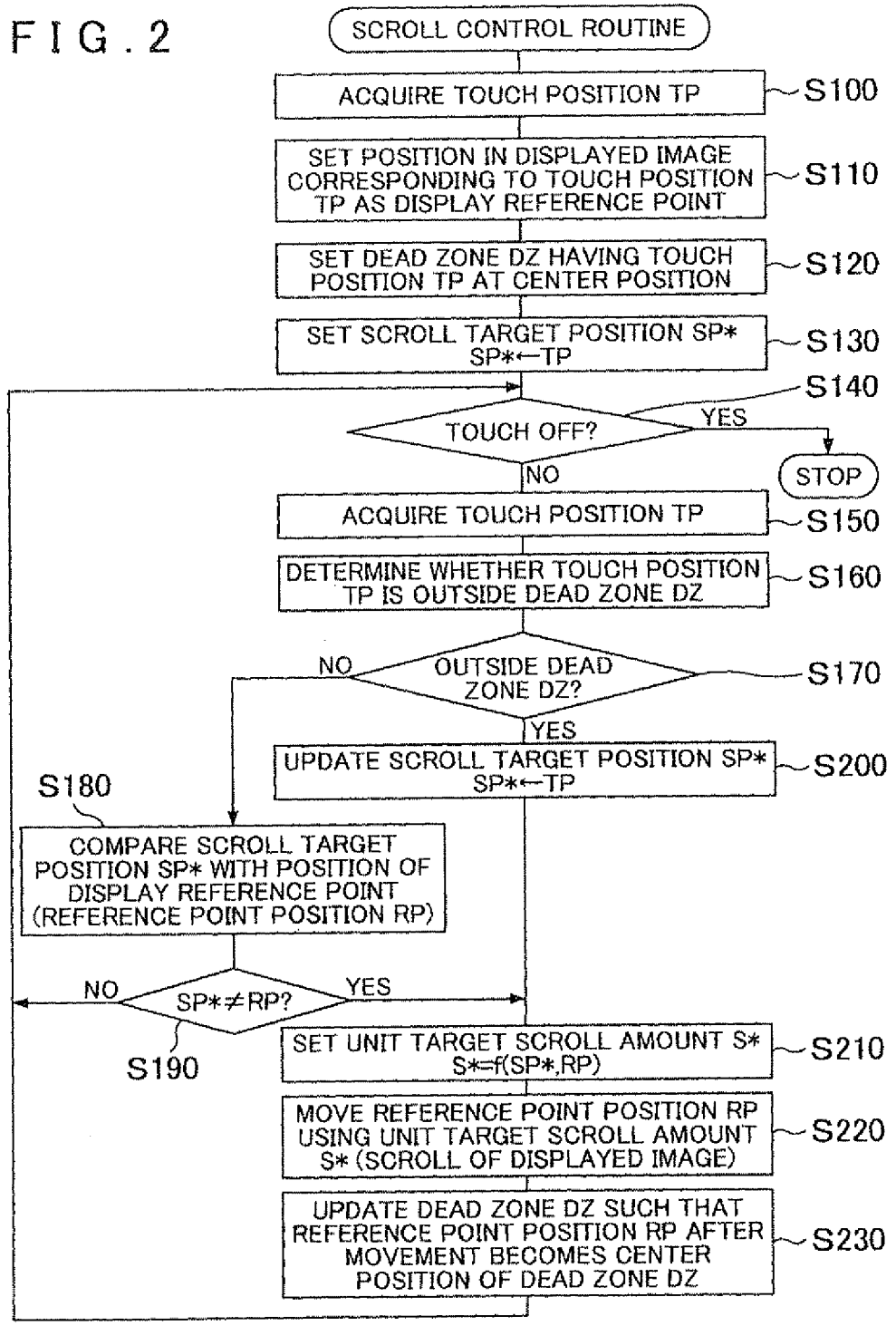
FIG. 2 is a flow chart showing an example of a scroll control routine to be executed by an electric control unit 30.

Next, the operation of the navigation device 20 configured as above as the display device in the embodiment, especially the operation of scrolling a displayed image that is an image displayed on the display 22 along with a movement of a touching object when the operator has moved the touching object such as a finger, a pen, or the like keeping the touch on the touch panel 24 (i.e., when the operator has performed a drag operation) is explained. FIG. 2 is a flow chart showing an example of a scroll control routine to be executed by the electric control unit 30. The routine starts to be executed when the touching object has touched the touch panel 24 (the touching object has started to touch the touch panel 24).

When the scroll control routine has been executed, the CPU 32 of the electric control unit 30 firstly acquires the touch position TP from the touch panel 24 (Step S100), sets as a display reference point the position on the displayed image corresponding to the acquired touch position TP (Step S110), sets a dead zone DZ (a zone where a touch is not detected) including the touch position TP at the center position (Step S120), and sets the touch position TP as a scroll target position SP* that is a target position of scroll on the displayed image (Step S130). Here, the display reference point is a position on the displayed image (for example, XX station, YY company, ZZ school, and the like). The touch position TP, a reference point position RP that is a position on the image display surface 22a corresponding to the display reference point, the center position of the dead zone DZ, the scroll target position SP* are positions on the touch panel 24 or the image display surface 22a (for example, a coordinate (x, y) of XY coordinate format having X direction in a horizontal direction and Y direction in a vertical direction) respectively. Consequently, when the displayed image is scrolled, the position on the displayed image as the display reference point does not move, but the position on the image display surface 22a as the reference point position RP moves. In addition, the dead zone DZ is set to prevent the displayed image from being scrolled along with an unintended movement of the touched position of the touching object on the touch panel 24 when the touched position has unintentionally moved with the touch panel 24 being touched by the touching object. In the embodiment, the dead zone DZ is set with an area (a circular area) within a predetermined distance (for example, a distance corresponding to 3 dots, 5 dots, and 7 dots of the display 22) from the center position. The processings at Step S110 to S130 are processings to set the reference point position RP (the position on the image display surface 22a corresponding to the display reference point), the dead zone DZ, and the scroll target position SP* based on the touch position TP when the touching object has started to touch the touch panel 24. Hereinafter, the touch position TP, the reference point position RP, the dead zone DZ, and the scroll target position SP* at this moment are referred to as an initial touch position TP0, an initial reference point position RP0, an initial dead zone DZ0, and an initial scroll target position SP0, respectively.

Figure 3:
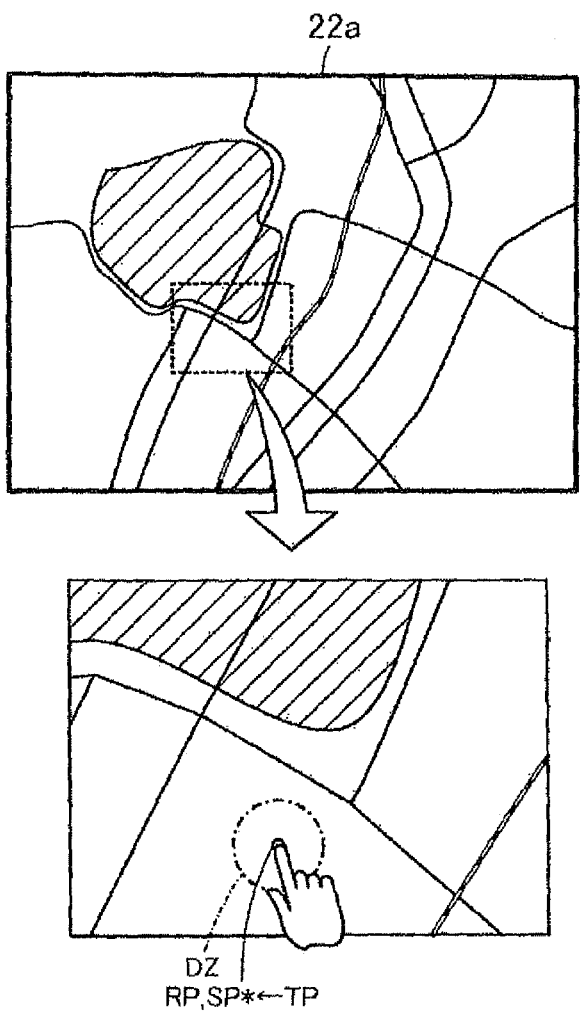
FIG. 3 illustrates an example of processings at Step S100 to S130 when a touching object has started to touch a touch panel 24.

FIG. 3 illustrates an example of the processings at Step S100 to S130 when the touching object has started to touch the touch panel 24. In FIG. 3, the upper figure shows the status of the image display surface 22a, and the lower figure is an enlarged view of the area bordered by a dotted line in the upper figure. The lower figure in FIG. 3 is an enlarged view of a partial area (the area bordered by four coordinates of the above-mentioned XY coordinate format (x1, y1), (x2, y1), (x1, y2), and (x2, y2) on the image display surface 22a to explain the touch position TP, the dead zone DZ, and the like. As seen from FIG. 3, the touch position TP, the reference point position RP, the scroll target position SP* accord and the dead zone DZ having the same position at the center position is set. Note that the touch position TP, the reference point position RP, the dead zone DZ, and the scroll target position SP* are conceptual and not displayed on the actual image display surface 22a.

Subsequently, the CPU 32 determines whether the touching object is touching the touch panel 24 (Step S140). If it has been determined that the touching object is not touching the touch panel 24, the CPU 32 terminates the routine. The determination of whether the touching object is touching the touch panel 24 can be performed by examining whether there is an input of the touch position TP from the touch panel 24.

If it has been determined that the touching object is touching the touch panel 24, the CPU 32 acquires the touch position TP from the touch panel 24 (Step S150) and determines whether the acquired touch position TP is inside or outside the dead zone DZ (Step S160, S170). If it has been determined that the touch position TP is inside the dead zone DZ, the CPU 32 does not update (hold) the scroll target position SP*, and determines whether the scroll target position SP* and the reference point position RP approximately accord (Step S180, S190). The determination at Step S180 and S190 is processings to determine whether it is necessary to scroll the displayed image. In the embodiment, the CPU 32 compares the distance between the scroll target position SP* and the reference point position RP with a smallest movement amount (for example, a distance corresponding to 1 dot of the display 22 or the like) as a smallest value for the movement amount of the reference point position RP that can be moved through an execution of unit scroll control, which is described later. When the distance between the scroll target position SP* and the reference point position RP is equal to or more than the smallest movement amount, the CPU 32 determines that the scroll target position SP* and the reference point position RP do not approximately accord. When the distance between the scroll target position SP* and the reference point position RP is less than the smallest movement amount (including a value 0), the CPU 32 determines that the scroll target position SP* and the reference point position RP approximately accord.

When it has been determined that the scroll target position SP* and the reference point position RP approximately accord, the CPU 32 judges that it is not necessary to scroll the displayed image and returns to Step S140 without scrolling the displayed image (without moving the reference point position RP). It is assumed that the touch position TP has not moved outside the dead zone DZ (the initial dead zone DZ0) since the touching object has started to touch the touch panel 24. When the touching object has started to touch the touch panel 24, the touch position TP, the reference point position RP, and the scroll target position SP* (the initial touch position TP0, the initial reference point position RP0, the initial scroll target position SP0) approximately accord (refer to the lower figure in FIG. 3). When the touch position TP has not moved outside the dead zone DZ (the initial dead zone DZ0) from such state, the scroll target position SP* is not updated (is held). Therefore, the state where the reference point position RP and the scroll target position SP* approximately accord continues. Consequently, it is possible to prevent the displayed image from being scrolled, for example, when the touching object has unintentionally moved in the vicinity of the initial touch position TP0.

When it has been determined at Step S160 and S170 that the touch position TP is outside the dead zone DZ, the CPU 32 updates the scroll target position SP* with the touch position TP acquired at Step S140 (Step S200). When the scroll target position SP* has been updated by this processing, or when it has been determined at Step S180 and S190 that the scroll target position SP* and the reference point position RP do not approximately accord, the CPU 32 judges that it is necessary to scroll the displayed image. Thereafter, the CPU 32 sets a unit target scroll amount S* that is a target amount of scroll of the displayed image for one scroll based on the scroll target position SP* and the reference point position RP (Step S210). The CPU 32 executes the unit scroll control to control the display 22 such that the reference point position RP is moved toward the scroll target position SP* (the displayed image is scrolled) by the set unit target scroll amount S* (Step S220), updates the dead zone DZ such that the reference point position RP moved through an execution of the unit scroll control becomes the center position of the dead zone DZ (Step S230), and returns to Step S140. FIGS. 4A, 4B, and 4C illustrate an example of the processings at Step S200 to S230 when the touch position TP is outside the dead zone DZ. FIGS. 4A, 4B, and 4C show the displayed image of the same area in the image display surface 22a as the area shown in the lower drawing in FIG. 3. As seen from FIGS. 4A, 4B, and 4C, when the touch position TP is outside the dead zone DZ, the CPU 32 updates the scroll target position SP* with the touch position TP (refer to FIG. 4A). Thereafter, the CPU 32 executes the unit scroll control such that the reference point position RP is moved toward the scroll target position SP* (the displayed image is scrolled) (refer to FIG. 4B), and updates the dead zone DZ such that the reference point position RP moved through an execution of the unit scroll control becomes the center position of the dead zone DZ (refer to FIG. 4C). Hereinafter, the processing (Step S210) to set the unit target scroll amount S*, the processing (Step S220) to execute the unit scroll control, and the processing (Step S230) to update the dead zone DZ are sequentially explained below.

First, the processings (Step S210, S220) to set the unit target scroll amount S* based on the scroll target position SP* and the reference point position RP and to execute the unit scroll control that controls the display 22 such that the reference point position RP is moved (the displayed image is scrolled) toward the scroll target position SP* by the set unit target scroll amount S* are explained. In the embodiment, the unit target scroll amount S* is set to a value that is acquired by multiplying the distance between the scroll target position SP* and the reference point position RP by a factor k (for example, 0.4, 0.5, 0.6, or the like) that is larger than 0 but smaller than 1. Consequently, by the unit scroll control, the displayed image is scrolled such that the reference point position RP is moved toward the scroll target position SP* by a distance shorter than the distance between the scroll target position SP* and the reference point position RP. Thereby, when the scroll target position SP* is moved (is updated), the displayed image is scrolled such that the reference point position RP moves following the movement of the scroll target position SP* every time the unit scroll control is executed. In addition, when the scroll target position SP* is not moved (is held), the displayed image is scrolled such that the reference point position RP gradually comes close to the scroll target position SP* every time the unit scroll control is executed. As a result, it is possible to make the reference point position RP difficult to be hidden by the touching object, for example, when the touching object is moving.

Next, the processing (Step S230) to update the dead zone DZ such that the reference point position RP moved through an execution of the unit scroll control is the center position of the dead zone DZ is explained. Firstly, in the embodiment, as mentioned above, the unit scroll control is executed using the unit target scroll amount S*. Therefore, the reference point position RP just after the unit scroll control is executed is a position by the unit target scroll amount S* close to the scroll target position SP* in relation to the reference point position RP just before the unit scroll control is executed. In addition, as mentioned above, the unit target scroll amount S* is a distance shorter than the distance between the scroll target position SP* and the reference point position RP. Thereby, it can be seen that the center position of the dead zone DZ after update (the reference point position RP just after the unit scroll control is executed) is the position between the scroll target position SP* and the center position (the reference point position just before the unit scroll control is executed) of the dead zone DZ before update. Here, when considering that the scroll target position SP* is updated with the touch position TP in case that the touch position TP is outside the dead zone DZ, it can be seen that, just after the touch position TP has moved outside the dead zone DZ, the center position of the dead zone DZ after update is the position between the touch position TP and the center position of the dead zone DZ before update.

Figure 5:
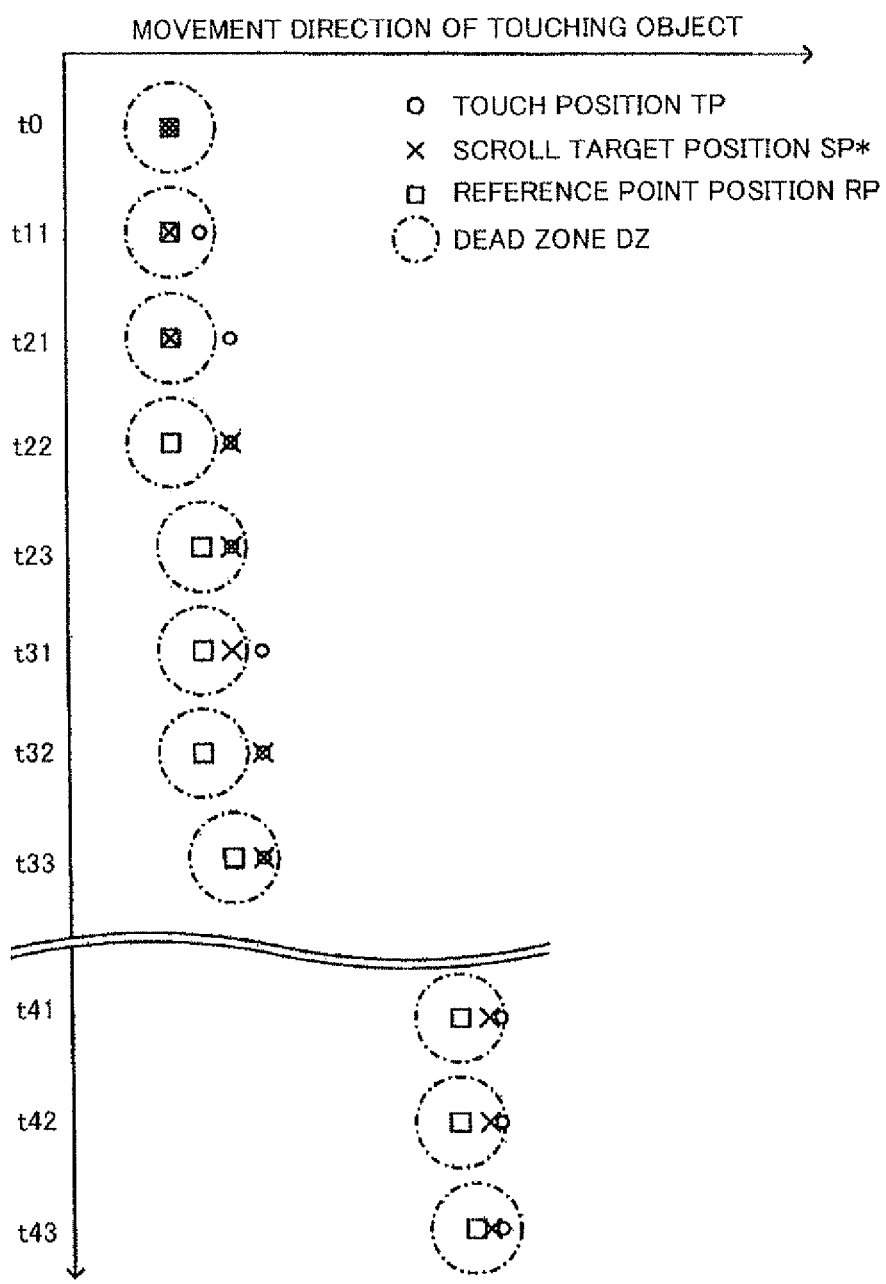
FIG. 5 schematically illustrates transition of the touch position TP, a scroll target position SP*, a reference point position RP, a dead zone DZ according to time-shift when the touching object such as a finger, a pen, or the like moves at a constant speed with the touch panel 24 being touched.

FIG. 5 schematically illustrates the transition of the touch position TP, the scroll target position SP*, the reference point position RP, the dead zone DZ according to the time-shift when the touching object such as a finger, a pen, or the like moves with the touch panel 24 being touched. In FIG. 5, "t0" indicates a time when the touching object starts to touch the touch panel 24, the touch position TP (the initial touch position TP0) is acquired, and the reference point position RP (the initial reference point position RP0), the dead zone DZ (the initial dead zone 0), the scroll target position SP* (the initial scroll target position SP0) are set. In addition, "t11" to "t43" indicate times after the touching object started to move. The number of the first digit in "t11" to "43" indicates the time when a series of processings of Step S140 to S230 were executed. Regarding the number of the second digit in "t11" to "t43", "1" indicates the time when the touch position TP was acquired (Step S140), "2" indicates the time when the scroll target position SP* was updated (Step S200), and "3" indicates the time when the unit scroll control was executed and the dead zone DZ was updated (Step S210 to S230). First, when the touching object has started to touch the touch panel 24, the CPU 32 acquires the touch position TP and sets the reference point position RP, the dead zone DZ, the scroll target position SP* (a time t0). When the CPU 32 has acquired the touch position TP (a time t11), if the acquired touch position TP is inside the dead zone DZ, the CPU 32 does not update the scroll target position SP*, does not scroll the displayed image (does not move the reference point position RP), and does not update the dead zone DZ. Therefore, in FIG. 5, times t12 and t13 are not shown. On the other hand, when the CPU 32 has acquired the touch position TP (a time t21), if the acquired touch position TP is outside the dead zone DZ, the CPU 32 updates the scroll target position SP* with the acquired touch position TP (a time t22), executes the unit scroll control based on the updated scroll target position SP* and the reference point position RP to scroll the displayed image, and updates the dead zone DZ such that the reference point position RP moved thereby is the center position of the dead zone DZ (a time 23). It is assumed that the touching object moves at a constant speed. Therefore, the next time when the CPU 32 has acquired the touch position TP (a time t31), if the acquired touch position TP is outside the dead zone DZ, the CPU 32 sets the scroll target position SP* (a time t32), executes the unit scroll control to scroll the displayed image, and updates the dead zone DZ (a time t33) in the same manner as the time t22 and t23. Consequently, the center position (the reference point position RP) of the dead zone DZ and the dead zone DZ moves following the movement of the scroll target position SP*. Thereby, when the touching object moves with the touch panel 24 being touched, it is possible to make the touch position TP difficult to enter the dead zone DZ, which makes it possible to more smoothly scroll the displayed image. Thereafter, when the CPU 32 has acquired the touch position TP (a time t41), if the touch position TP is inside the dead zone DZ, the CPU 32 does not update the scroll target position SP* (a time t42). However, if the scroll target position SP* and the reference point position RP do not approximately accord, the CPU 32 executes the unit scroll control such that the reference point position RP moves toward the scroll target position SP* to scroll the displayed image, and updates the dead zone DZ (a time t43).

Here, it is assumed that the touching object such as a finger, a pen, or the like moves at a constant speed with the touch panel 24 being touched. First, when the touching object touches the touch panel 24, the CPU 32 sets the reference point position RP (the initial reference point position RP0), the dead zone DZ (the initial dead zone DZ0), and the like based on the touch position TP (the initial touch position TP0). Thereafter, when the touch position TP moves outside the dead zone DZ, if the CPU 32 updates the dead zone DZ such that the touch position TP becomes the center position of the dead zone DZ (an example for comparison), the time until the touch position TP moves outside the dead zone DZ next after the dead zone DZ is updated becomes long. That is, the time until the touch position TP moves outside the dead zone DZ next after the dead zone DZ is updated becomes the same as the time until the initial touch position TP0 moves outside the initial dead zone DZ0. When the touch position TP is inside the dead zone DZ, the scroll target position SP* is not updated. Therefore, the updating frequency of the scroll target position SP* decreases although the touching object is moving at the constant speed. When the updating frequency of the scroll target position SP* is low (is likely to be held), the movement of the scroll target position SP* becomes nonsmooth. Thereby, the scroll of the displayed image (the movement of the reference point position RP) based on the scroll target position SP* could be nonsmooth. On the other hand, in the embodiment, when the touch position TP moves outside the dead zone DZ, the CPU 32 updates the dead zone DZ such that the position between the touch position TP (the scroll target position SP*) and the center position of the current dead zone DZ (the reference point position RP just before the unit scroll control is executed) becomes the center position of the dead zone DZ. Therefore, when the touching position TP is moving, it becomes difficult that the touch position TP that is firstly acquired after the dead zone DZ is updated enters the dead zone DZ, and the time until the touch position TP moves outside the dead zone DZ next after the dead zone DZ is updated becomes short. Thereby, when the touching object moves with the touch panel 24 being touched, it is possible to make the movement of the scroll target position SP* smoother by increasing the updating frequency of the scroll target position SP*. Therefore, it becomes possible to make the scroll of the displayed image based on the scroll target position SP* smoother.

Figure 6:
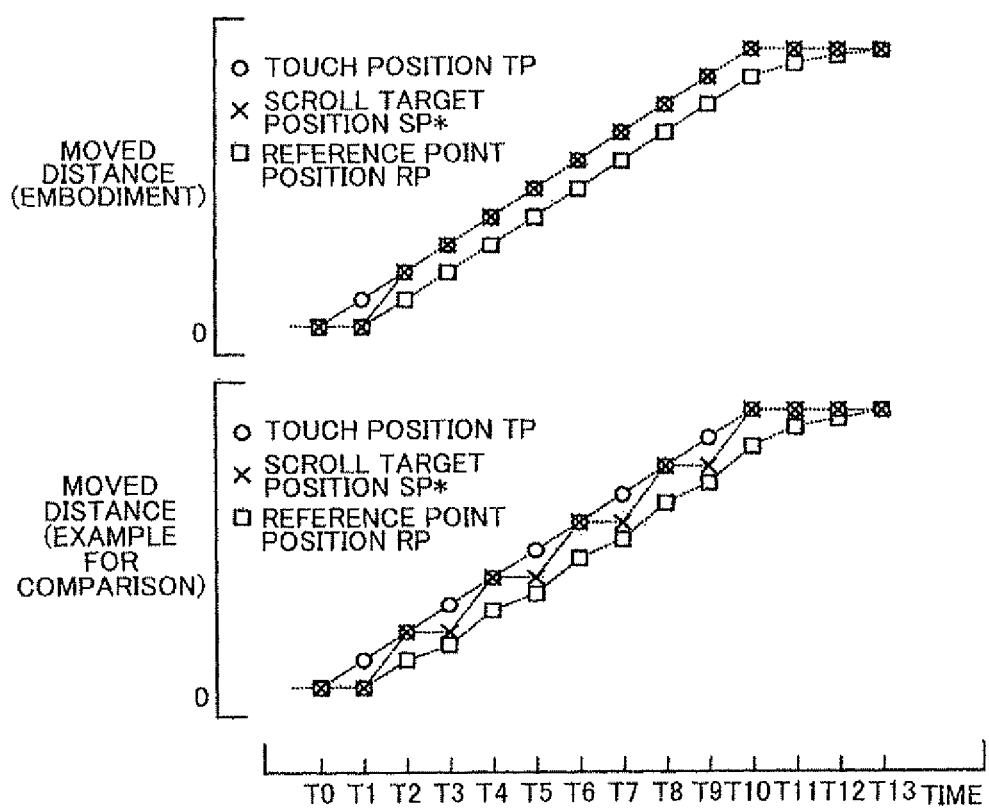
FIG. 6 illustrates an example of the transition of the touch position TP and the reference point position RP according to time shift when the touching object such as a finger, a pen, or the like moves with the touch panel 24 being touched.

FIG. 6 illustrates an example of the transition of the touch position TP and the reference point position RP according to the time shift when the touching object such as a finger, a pen, or the like moves with the touch panel 24 being touched. In FIG. 6, the upper drawing illustrates the embodiment in which the dead zone DZ is updated such that the reference point position RP moved through an execution of the unit scroll control becomes the center position of the dead zone DZ when the touch position TP has moved outside the dead zone DZ. The lower drawing illustrates an example for comparison in which the dead zone DZ is updated such that the touch position TP becomes the center position of the dead zone DZ when the touch position TP has moved outside the dead zone DZ. In addition, in the example of FIG. 6, from the state in which the touch position TP, the reference point position RP, and the scroll target position SP* approximately accord (the time t0), the touch position TP moves at a constant speed slightly slower than the speed at which the above-mentioned distance (a distance to determine the dead zone DZ) is moved for a unit of time (times T1 to T10), and thereafter the touch position TP does not change (times T11 to T13). In the example for comparison, as mentioned above, because the time until the touch position TP moves outside the dead zone DZ next after the dead zone DZ is updated becomes long, the updating frequency of the scroll target position SP* decreases (the frequency that the scroll target position SP* is held increases), and thereby the scroll of the displayed image (the movement of the reference point position RP) can be nonsmooth. On the other hand, in the embodiment, because it becomes difficult that the touch position TP that is firstly acquired after the dead zone DZ is updated enters the dead zone DZ, and the time until the touch position TP moves outside the dead zone DZ next after the dead zone DZ is updated becomes short, the updating frequency of the scroll target position SP* increases, and thereby the scroll of the displayed image (the movement of the reference point position RP) can be smooth. In both the embodiment and the example for comparison, after the touch position TP has moved outside the dead zone DZ, if the touch position TP does not change any more (the times T11 to T13), the displayed image is scrolled such that the reference point position RP comes close to the finally-set scroll target position SP*.

According to the navigation device 20 as the display device in the above-mentioned embodiment, when the touching object such as a finger, a pen, or the like has touched the touch panel 24, the CPU 32 sets the reference point position RP, the dead zone DZ including the touch position TP at the center position, and the scroll target position SP* based on the touch position TP. When the touch position TP has not moved outside the dead zone DZ, the CPU 32 does not update the scroll target position SP*. When the touch position TP has moved outside the dead zone DZ, the CPU 32 updates the scroll target position SP* with the touch position TP, and executes the unit scroll control to control the display 22 such that the reference point position RP moves toward the scroll target position SP* (the displayed image is scrolled). When the touch position TP has moved outside the dead zone DZ, the CPU 32 updates the dead zone DZ such that the position between the touch position TP (the scroll target position SP*) and the reference point position RP just before the unit scroll control is executed becomes the center position of the dead zone DZ. Thereby, compared to updating the dead zone DZ such that the touch position TP becomes the center position of the dead zone DZ, when the touching object is moving (the touch position TP is moving), it becomes difficult that the touch position TP enters the dead zone DZ, and the time until the touch position TP moves outside the dead zone DZ next becomes short. Therefore, it is possible to make the movement of the scroll target position SP* smoother by increasing the updating frequency of the scroll target position SP*. As a result, it become possible to make the scroll of the displayed image based on the scroll target position SP* smoother.

According to the navigation device 20 as the display device in the embodiment, the CPU 32 executes the unit scroll control to control display 22 such that the reference point position RP moves (the displayed image is scrolled) toward the scroll target position SP* using the distance shorter than the distance between the scroll target position SP* and the reference point position RP as the unit target scroll amount S*. That is, when the scroll target position SP* is not moved (is held), the displayed image is scrolled such that the reference point position RP gradually comes close to the scroll target position SP*. When the scroll target position SP* is moved (is updated), the displayed image is scrolled such that the reference point position RP moves following the movement of the scroll target position SP*. Therefore, it is possible to make the reference point position RP difficult to be hidden by the touching object or the like when the touching object is moving with the touch panel 24 being touched.

In the navigation device 20 in the embodiment, an area (a circular area) within a predetermined distance from the center position is set as the dead zone DZ. However, a rectangular area having the center position as a barycenter may be set as the dead zone DZ.

In the navigation device 20 in the embodiment, the unit scroll control is executed using a value acquired by multiplying the distance between the scroll target position SP* and the reference point position RP by a factor k (0<k<1) as the unit target scroll amount S*. However, it is only necessary that, when the scroll target position SP* is not moved (is held), the displayed image is scrolled such that the reference point position RP gradually comes close to the scroll target position SP*, and when the scroll target position SP* is moved (is updated), the displayed image is scrolled such that the reference point position RP moves following the movement of the scroll target position SP*. For example, the unit scroll control may be executed using a predetermined amount smaller than the distance between the reference point position RP when the scroll target position SP* has been updated and the scroll target position SP* at such moment (for example, one-Xth of the distance or the like) as the unit target scroll amount S*.

In the navigation device 20 in the embodiment, the dead zone DZ is updated such that the reference point position RP just after the unit scroll control has been executed using the unit target scroll amount S* becomes the center position of the dead zone DZ, that is, the dead zone DZ is updated after the unit scroll control was executed. However, because it is assumed that the unit target scroll amount S* is the same as the movement amount of the reference point position RP by an execution of the unit scroll control, the unit scroll control may be executed using the unit target scroll amount S* after the dead zone DZ was updated such that the position on the side of the scroll target position SP* in relation to the reference point position RP just before the unit scroll control by the unit target scroll amount S* was executed becomes the center position of the dead zone DZ.

Figure 7:
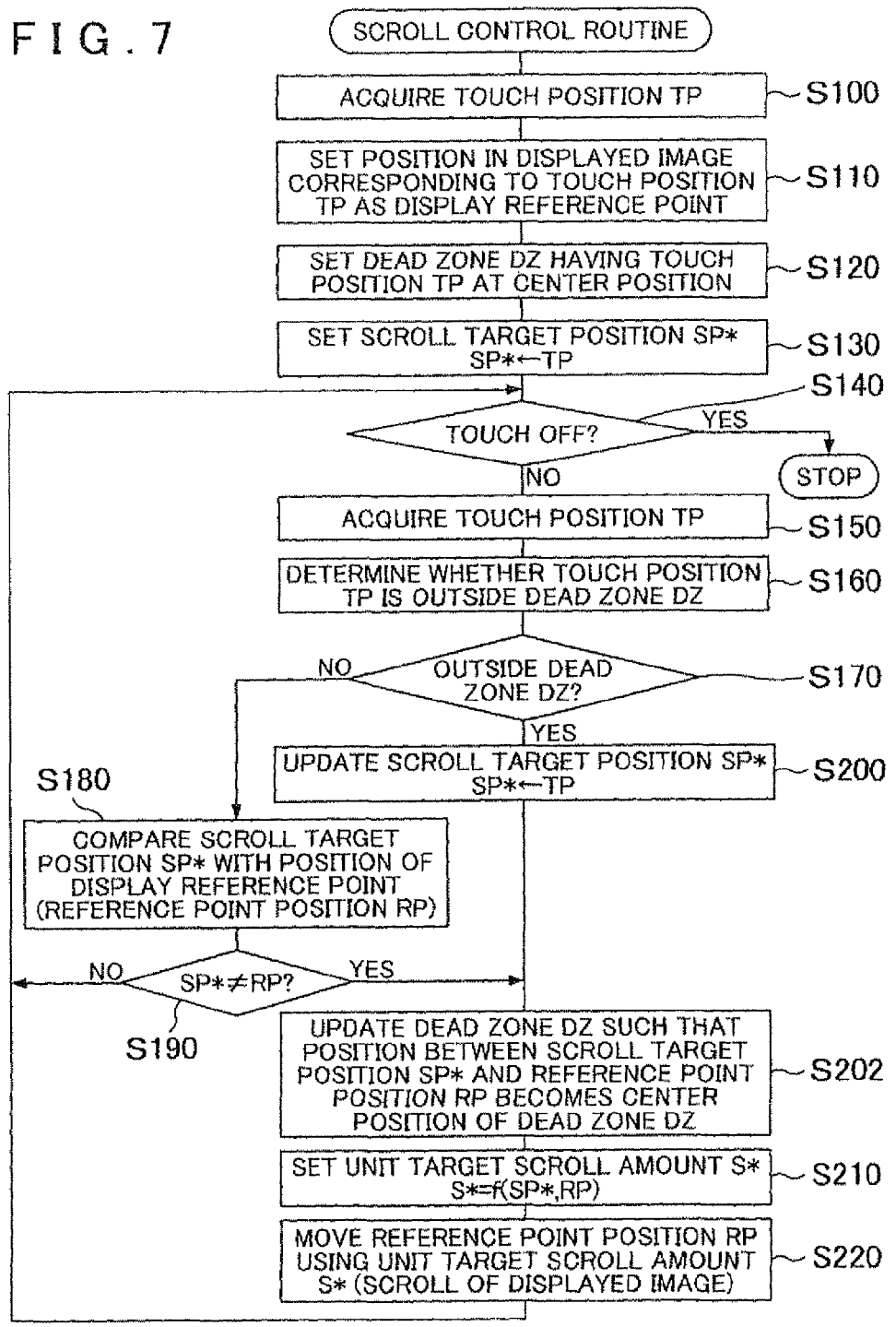
FIG. 7 is a flow chart showing an example of the scroll control routine according to a modification example.

In the navigation device 20 in the embodiment, when the touch position TP is outside the dead zone DZ, the touch position TP is set as the scroll target position SP* and the unit scroll control is executed based on the set scroll target position SP* and the reference point position RP, and the dead zone DZ is updated such that the reference point position RP moved through an execution of the unit scroll control becomes the center position of the dead zone DZ. However, the dead zone DZ may be updated such that a position different from the reference point position RP moved through an execution of the unit scroll control becomes the center position of the dead zone DZ. An example of the scroll control routine in such case is shown in FIG. 7. The routine in FIG. 7 is the same as the routine in FIG. 2 except that the processing at Step S202 is added to the routine in FIG. 2 and the processing at Step S230 of the routine in FIG. 2 is not executed. Consequently, the same step number is assigned to the same processing and the detailed explanation is omitted. In the scroll control routine in FIG. 7, when it has been determined at Step S160 and S170 that the touch position TP is outside the dead zone DZ and the CPU 32 has updated the scroll target position SP* with the touch position TP at Step S200, or when it has been determined at Step S160 and S170 that the touch position TP is inside the dead zone DZ but it has been determined at Step S180 and S190 that the scroll target position SP* and the reference point position RP do not approximately accord, the CPU 32 updates the dead zone DZ such that the position between the scroll target position SP* and the reference point position RP becomes the center position of the dead zone DZ (Step S202). Thereafter, the CPU 32 sets the unit target scroll amount S* based on the scroll target position SP* and the reference point position RP (Step S210), executes the unit scroll control using the set unit target scroll amount S* (Step S220), and returns to Step S140. Here, in the example of the modification, the CPU 32 updates the dead zone DZ such that the position on the side of the scroll target position SP* in relation to the reference point position RP by the distance that is acquired by multiplying the distance between the scroll target position SP* and the reference point position RP (the reference point position RP just before the unit scroll control is executed) by a factor k2 (for example, 0.4, 0.5, 0.6, or the like) that is larger than 0 but smaller than 1 becomes the center position of the dead zone DZ. Consequently, when the touch position TP is outside the dead zone DZ and the scroll target position SP* is moved (is updated), the center position of the dead zone DZ gradually moves toward the scroll target position SP*. In addition, when the touch position TP is inside the dead zone DZ, the scroll target position SP* is not moved (is held), and the scroll target position SP* and the reference point position RP do not approximately accord, the center position of the dead zone DZ gradually comes close to the scroll target position SP*. Also, in the example of the modification as the embodiment, compared to updating the dead zone DZ such that the touch position TP becomes the center position of the dead zone DZ, when the touching object is moving (the touch position TP is moving), it becomes difficult that the touch position TP enters the dead zone DZ, and the time until the touch position TP moves outside the dead zone DZ next becomes short. Therefore, it is possible to make the movement of the scroll target position SP* smoother by increasing the updating frequency of the scroll target position SP*. As a result, it becomes possible to make the scroll of the displayed image based on the scroll target position SP* smoother.

In case of the example of the modification, it is considered that the movement amount of the center position of the dead zone DZ is not necessary to be associated with the unit target scroll amount S* (the scroll amount of the displayed image for one scroll). Therefore, the distance between the scroll target position SP* and the reference point position RP may be utilized as the unit target scroll amount S*, that is, the displayed image may be scrolled in accordance with the movement of the scroll target position SP* without delay. In the navigation device 20 in the embodiment, the touch position TP is set as the scroll target position SP*, the unit scroll control is executed using the unit target scroll amount S* based on the scroll target position SP* and the reference point position RP, and the dead zone DZ is updated such that the immediate reference point position RP becomes the center position of the dead zone DZ. Therefore, if the displayed image is scrolled in accordance with the movement of the scroll target position SP* without delay, the dead zone DZ is updated such that the scroll target position SP* becomes the center position of the dead zone DZ. In this case, as explained in the embodiment, the displayed image is necessary to be scrolled such that the reference point position RP moves following the movement of the scroll target position SP*.

In case of the example of the modification, it is considered that the movement of the center position of the dead zone DZ is not necessary to be associated with the movement of the reference point position RP through an execution of the unit scroll control (scroll of the displayed image). Therefore, when it has been determined that the touch position TP is inside the dead zone DZ, the dead zone DZ may not be updated regardless of whether the scroll target position SP* and the reference point position RP accord (in the routine in FIG. 7, when it has been determined at Step S160 and S170 that the touch position TP is inside the dead zone DZ and it has been determined at Step S180 and Step S190 that the scroll target position SP* and the reference point position RP do not approximately accord, the procedure proceeds to Step S210).

Figure 8:
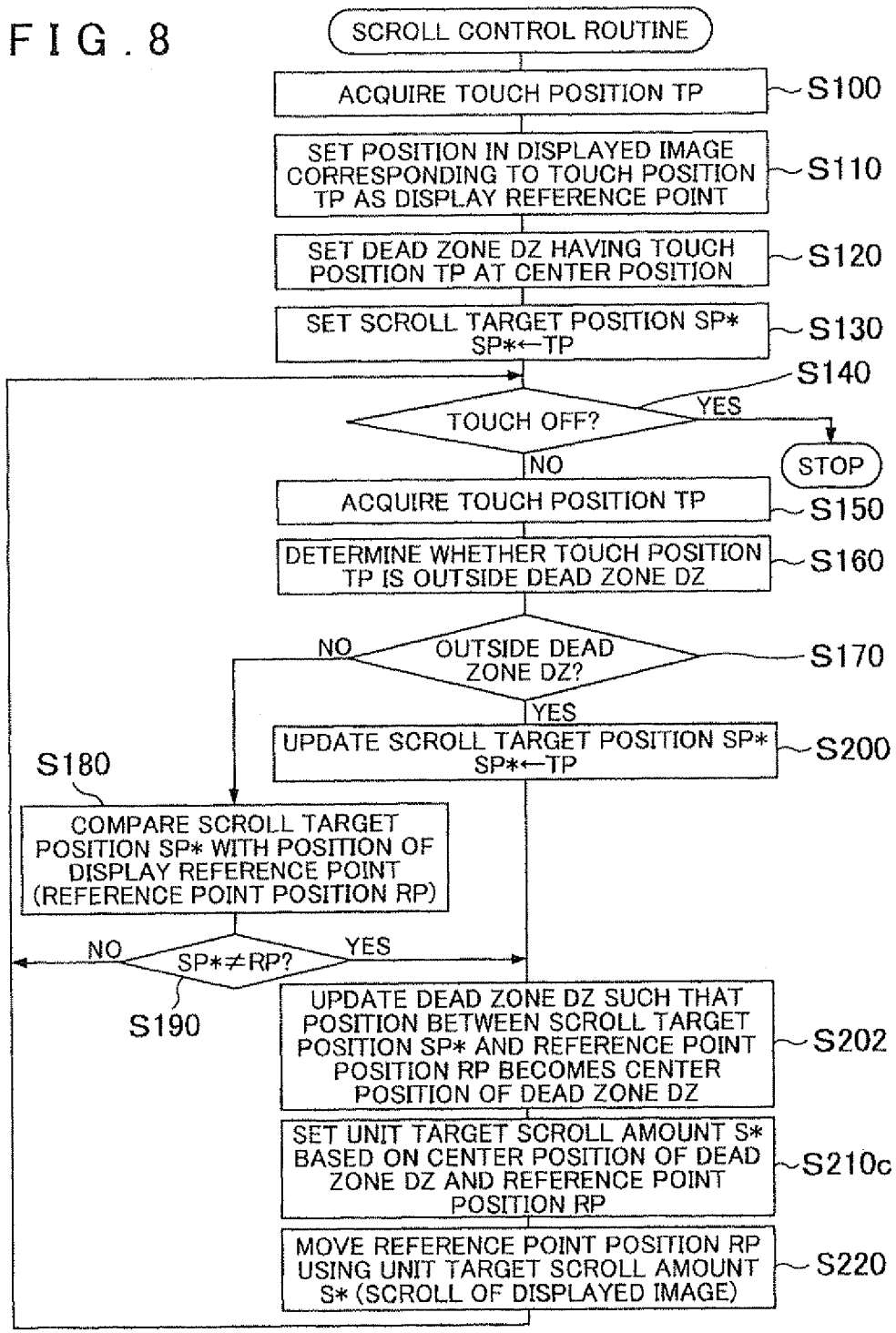
FIG. 8 is a flow chart showing another example of the scroll control routine according to the modification example.

In addition, in the example of the modification, in the same manner as the navigation device 20 in the embodiment, the unit scroll control is executed using the unit target scroll amount S* based on the scroll target position SP* and the reference point position RP independently of the center position of the dead zone DZ. However, the dead zone DZ is updated before executing the unit scroll control in the example of the modification. Therefore, the unit scroll control may be executed based on the center position of the dead zone DZ. An example of the scroll control routine in this case is shown in FIG. 8. The routine in FIG. 8 is the same as the routine in FIG. 7 except that the processing at Step S201c is executed in place of the processing at Step S210 of the routine in FIG. 7. Consequently, the same step number is assigned to the same processing and the detailed explanation is omitted. In the scroll control routine in FIG. 8, when the CPU 32 updates the dead zone DZ such that the position between the scroll target position SP* and the reference point position RP becomes the center position of the dead zone DZ, the CPU 32 sets the unit target scroll amount S* based on the center position of the dead zone DZ and the reference point position RP (Step S210c), executes the unit scroll control using the set unit target scroll amount S* (Step S220), and returns to Step S140. Here, the unit target scroll amount S* may be set to the distance between the center position of the dead zone DZ and the reference point position RP because the center position of the dead zone DZ is a position between the scroll target position SP* and the reference point position RP. In this case, if the factor k2 used to set the center position of the dead zone DZ is the same value as the factor k1 used to set the unit target scroll amount S*, the movement of the dead zone DZ and the scroll of the displayed image becomes the same as the embodiment. In addition, the unit target scroll amount S* may be a value acquired by multiplying the distance between the center position of the dead zone DZ and the reference point position RP by a factor k3.

In the embodiment, the present invention is applied to the navigation device 20 as the display device. However, the present invention is not limited to the navigation device 20, and may be applied to any display devices, provided that the display device includes a display unit that displays an image on the image display surface and a touch panel that is installed on the image display surface of the display unit and detects the touched position of a touching object, for example, cellular phones, information terminals, copying devices, facsimiles, printers, home video game machines, and the like.

In addition, in the embodiment, the present invention is applied to the navigation device 20 as the display device. However, the present invention may be applied to a control method of the display device, or a program to cause a computer to execute the respective steps of the control method of the display device.

The correspondence relation between the main elements of the embodiment and the main elements of the invention described in the section of the [Means for Solving the Problems] is explained. In the embodiment, the display 22 corresponds to the "display unit" The touch panel 24 corresponds to the "touch panel" The electric control unit 30 that executes the processing at Step S110 of the scroll control routine in FIG. 2 to set the dead zone DZ including the touch position TP at the center position when the touching object such as a finger, a pen, or the like has started to touch the touch panel 24 and the processing at Step 230 of the scroll control routine in FIG. 2 to update the dead zone DZ such that the position between the touch position TP and the reference point position RP just before the unit scroll control is executed becomes the center position of the dead zone DZ when the touch position TP is outside the dead zone DZ corresponds to the "dead zone setting unit". The electric control unit 30 that executes the processings at Step S170 and S200 of the scroll control routine in FIG. 2 not to update the scroll target position SP* when the touch position TP has not moved outside the dead zone DZ and to update the scroll target position SP* with the touch position TP when the touch position TP has moved outside the dead zone DZ corresponds to the "scroll target position setting unit". The electric control unit 30 that executes the processing at Step S220 of the scroll control routine in FIG. 2 to execute the unit scroll control to control the display 22 such that the reference point position RP moves toward the scroll target position SP* (the displayed image is scrolled) when the scroll target position SP* and the reference point position RP do not approximately accord corresponds to the "scroll control unit". In addition, the electric control unit 30 that executes the processing at Step S110 of the scroll control routine in FIG. 2 to set the position in the displayed image corresponding to the touch position TP as the display reference point when the touching object such as a finger, a pen, or the like has started to touch the touch panel 24 corresponds to the "display reference point setting unit".

The correspondence relation between the main elements of the embodiment and the main elements of the invention described in the section of the [Means for Solving the Problems] is an example to specifically explain the modes in which the embodiment carries out the invention described in described in the section of the [Means for Solving the Problems]. Therefore, the elements of the invention described in the section of the [Means for Solving the Problems] are not limited thereto. That is, the interpretation of the invention described in the section of the [Means for Solving the Problems] should be performed based on the description in the section. Therefore, the embodiment is merely a specific example of the invention described in the section of the [Means for Solving the Problems].

The modes for carrying out the invention are explained using the embodiment. However, the present invention is not limited to the embodiment. The present invention is carried out in various kinds of modes without departing from the broad spirit and scope of the underlying principles.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

Industrial Applicability

The present invention can be utilized for the manufacturing industry of display devices and the like.

The invention claimed is:

1. A display device including a display unit that displays an image on an image display surface and a touch panel that detects a touched position of a touching object, the touch panel being installed on the image display surface of the display unit, comprising:
  a dead zone setting unit that, when the touching object has touched the touch panel, sets as a dead zone an area including a touched position of the touching object on the touch panel as a center position of the set area;
  a scroll target position setting unit that,
    when the touching object has not moved outside the set dead zone with the touch panel being touched, holds a scroll target position serving as a target position of scroll of a displayed image that is an image displayed on the image display surface, and
    when the touching object has moved outside the set dead zone with the touch panel being touched, updates the scroll target position with the touched position of the touching object on the touch panel; and
  a scroll controlling unit that controls the display unit such that the displayed image is scrolled according to the set scroll target position, wherein
  the dead zone setting unit, when the touching object has moved outside the set dead zone with the touch panel being touched, updates the dead zone such that an intermediate position becomes the center position of the dead zone, the intermediate position being a position between the touched position of the touching object on the touch panel and the center position of the set dead zone.

2. The display device according to claim 1, comprising a display reference point setting unit that, when the touching object has touched the touch panel, sets as a display reference point a position in the displayed image corresponding to the touched position of the touching object on the touch panel, wherein
  the scroll controlling unit is a unit that repeatedly executes unit scroll control to control the display unit such that a reference point position that is a position on the display unit corresponding to the set display reference point is moved toward the set scroll target position by a distance shorter than a distance between the reference point position and the set scroll target position when scrolling the displayed image, and
  the dead zone setting unit is a unit that updates the center position of the dead zone using the reference point position that was moved through an execution of the unit scroll control as the intermediate position.

3. The display device according to claim 2, wherein
the scroll control unit is a unit that controls the display unit, as the unit scroll control, such that the reference point position is moved toward the set scroll target position by a predetermined rate of the distance between the set scroll target position and the reference point position.

4. The display device according to claim 1, wherein
the dead zone setting unit is a unit that, after the touching object has moved outside the set dead zone with the touch panel being touched, updates the dead zone such that the intermediate position that gradually moves toward the set scroll target position becomes the center position of the dead zone.

5. The display device according to claim 4, comprising
a display reference point setting unit that, when the touching object has touched the touch panel, sets as a display reference point a position in the displayed image corresponding to the touched position of the touching object on the touch panel, wherein
the scroll controlling unit is a unit that repeatedly executes unit scroll control to control the display unit such that a reference point position that is a position on the display unit corresponding to the set display reference point is moved toward the set scroll target position by a distance shorter than a distance between the reference point position and the set scroll target position when scrolling the displayed image.

6. The display device according to claim 5, wherein
the scroll controlling unit is a unit that controls the display unit, as the unit scroll control, such that the reference point position accords to the center position of the set dead zone.

7. A control method of a display device including a display unit that displays an image on an image display surface and a touch panel that detects a touched position of a touching object, the touch panel being installed on the image display surface of the display unit, comprising the steps of:
(a) when the touching object has touched the touch panel, setting as a dead zone an area including a touched position of the touching object on the touch panel as a center position of the set area;
(b) when the touching object:
has not moved outside the set dead zone with the touch panel being touched, holding a scroll target position serving as a target position of scroll of a displayed image that is an image displayed on the image display surface, and
has moved outside the set dead zone with the touch panel being touched, updating the scroll target position with the touched position of the touching object on the touch panel; and
(c) controlling the display unit such that the displayed image is scrolled according to the set scroll target position, wherein
the step (a) is a step of updating, when the touching object has moved outside the set dead zone with the touch panel being touched, the dead zone such that an intermediate position becomes the center position of the dead zone, the intermediate position being a position between the touched position of the touching object on the touch panel and the center position of the set dead zone.

8. A non-transitory computer-readable storage medium storing a computer-executable display control program that, when executed by a computer, causes the computer to execute the steps of:
(a) when the touching, object has touched the touch panel, setting as a dead zone an area including a touched position of the touching object on the touch panel as a center position of the set area:
(b) when the touching object:
has not moved outside the set dead zone with the touch panel being touched, holding a scroll target position serving as a target position of scroll of a displayed image that is an image displayed on the image display surface, and
has moved outside the set dead zone with the touch panel being touched, updating the scroll target position with the touched position of the touching object on the touch panel; and
(c) controlling the display unit such that the displayed image is scrolled according to the set scroll target position, wherein
the step (a) is a step of updating, when the touching object has moved outside the set dead zone with the touch panel being touched, the dead zone such that an intermediate position becomes the center position of the dead zone, the intermediate position being a position between the touched position of the touching object on the touch panel and the center position of the set dead zone.

* * * * *